Dec. 16, 1969  D. H. AYLOTT  3,483,637
DEVICE FOR TESTING ARTIFICIAL EYELASHES
Filed Aug. 3, 1967  3 Sheets-Sheet 1
FIG.3.  FIG.1.  FIG.2.
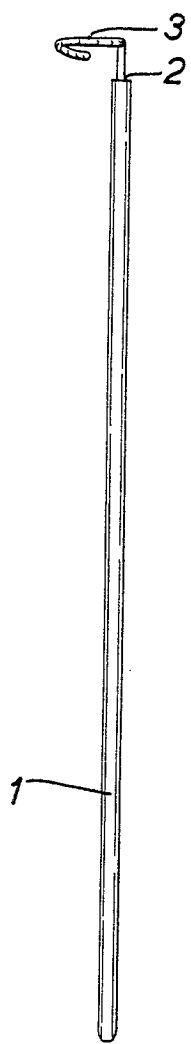
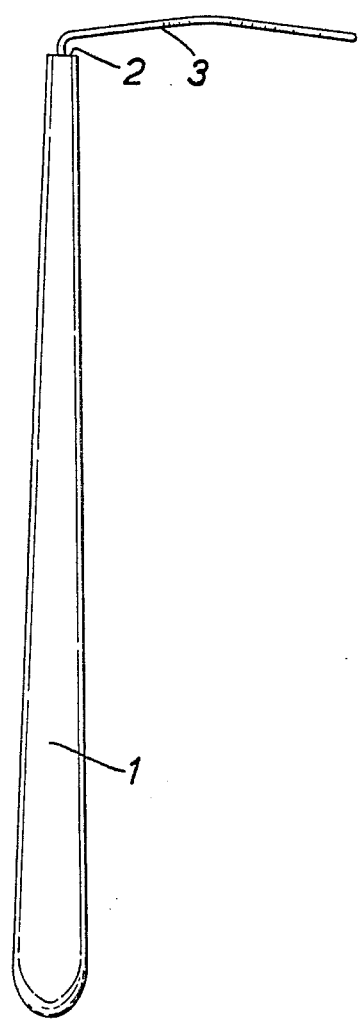
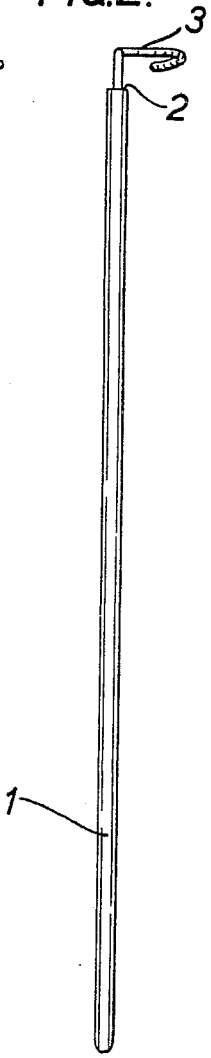
FIG.4.
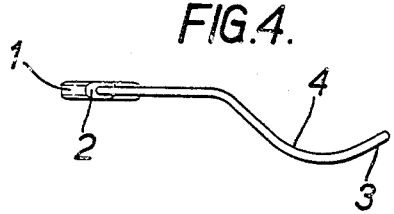

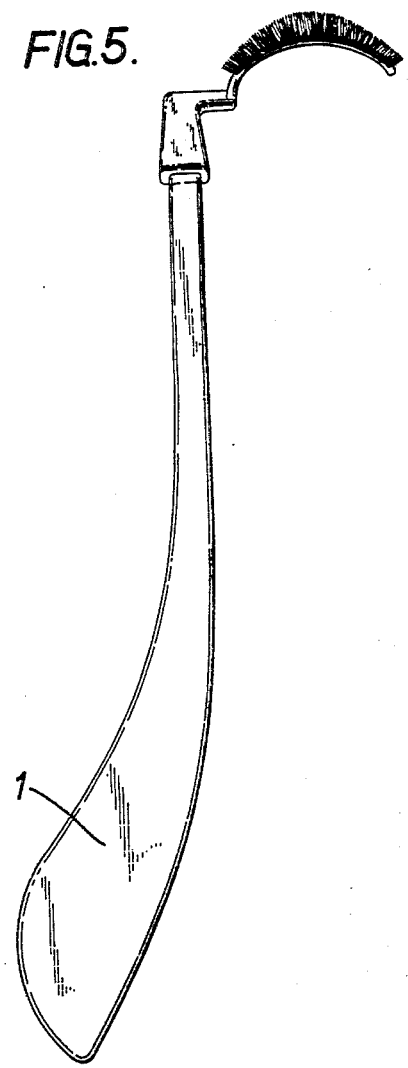
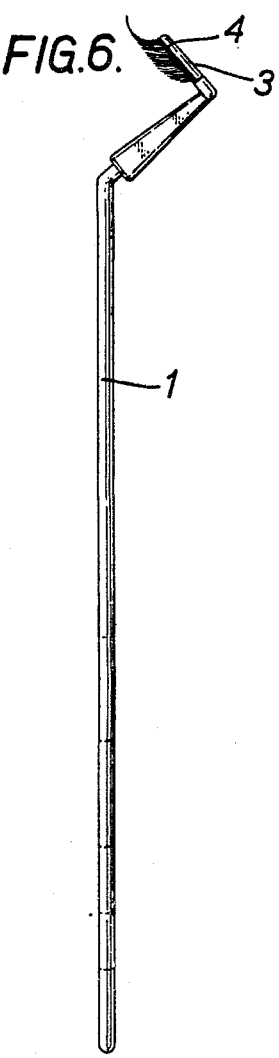
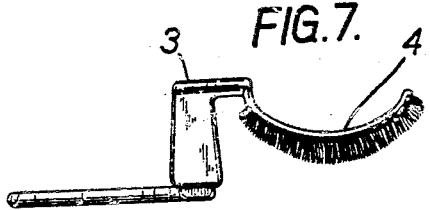

United States Patent Office 3,483,637
Patented Dec. 16, 1969

3,483,637
DEVICE FOR TESTING ARTIFICIAL EYELASHES
David H. Aylott, Welwyn Garden City, England, assignor to Eylure Limited, Welwyn Garden City, England, a British company
Filed Aug. 3, 1967, Ser. No. 658,096
Claims priority, application Great Britain, Aug. 9, 1966, 35,525/66
Int. Cl. G09b 25/00
U.S. Cl. 35—59      3 Claims

ABSTRACT OF THE DISCLOSURE

The idea of the present invention is to provide a device by means of which artificial eyelashes may be held up against the eye by the user so that the user may assess her appearance when wearing a particular set of artificial eyelashes. The device has a handle which may be held by the user in a substantially vertical position and an eyelash holder extending sideways from the handle and provided with clip means into which a set of artificial eyelashes may be inserted.

---

Artificial eyelashes are now an established part of cosmetic equipment and are available in a wide variety of shapes and sizes. This has introduced its own problem in the sense that it is not easy for a girl to select a particular shape of eyelash to suit her own appearance. One object of the present invention is to provide what may be called an eyelash tester by means of which a girl may readily test eyelashes to see how they look on her.

According to the present invention we provide an eyelash tester comprising a handle adapted to be held substantially vertically and an eyelash holder projecting sideways from the handle at one end thereof and shaped to the natural curve of an eyelid so that the tester may be held against a girl's eye with an artificial eyelash set in position to test the appearance of a particular eyelash set. The tester may have one eyelash set semi-permanently in position in the holder so that several different testers will be needed to test several different eyelash sets. Alternatively the holder may comprise a clip or the like and sets may be clipped in and out of position and may be interchanged in one tester.

The underlying idea of this device is that it will act as an eyelash tester at the point of sale and will enable a girl to see exactly how she will look with artificial eyelashes on and will get a good idea of how different types of artificial eyelashes will suit her.

The handle of the tester can be made in many different and attractive shapes and may be made of any suitable material e.g. metal or a suitable plastics material. The holder may be clipped or otherwise secured at the end of the handle and will project sideways from the handle more or less at right angles. The holder may be made of wire or a section of plastics material shaped to the natural curve of the eyelid so that when the device is held up to the eye the lashes are displayed immediately above the girl's own eyelashes and the girl can see the effect. It may be so arranged that four to six or more of these tests may be provided at the point of sale, each displaying a different type of eyelash. A further development within the scope of this invention is to provide a small plastics or other box with just the holder or frame which holds an eyelash set contained in the box. When this product is produced the handle may be an injection moulded part and the wire or plastics section at the top which holds the eyelash set will be made to clip into the top of the handle.

In order that the invention may be more clearly understood and readily carried into effect reference is now directed to the accompanying drawings in which:

FIGURE 1 is a front view of one embodiment of the invention.

FIGURE 2 is a side view in the direction of the arrow A.

FIGURE 3 is a side view in the direction of the arrow B.

FIGURE 4 is a plan view.

FIGURE 5 is a front elevation of another embodiment of the invention showing an eyelash set in position; and FIGURES 6 and 7 are respectively a side elevation and a top plan view of the embodiment illustrated in FIGURE 5.

Figure 8:
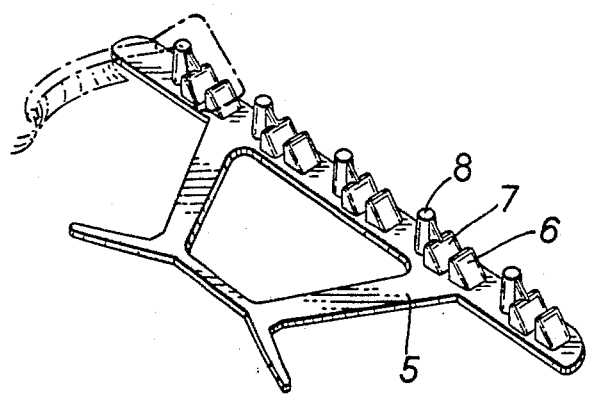

In the embodiment illustrated in FIGURES 1 to 4 the eyelash tester comprises a handle 1 into one end 2 of which an eyelash holder 3 is inserted. The holder 3 is shaped as shown in the drawing and to test an eyelash set the eyelash set is secured to the crooked part 4 of the holder 3 which is shaped to match the curvature of the eye. The eyelash tester with the eyelash set in position can then be held up to the eye so that a girl can decide whether that particular eyelash set looks correct or not.

FIGURES 5, 6, and 7 illustrate a rather more sophisticated embodiment of the invention with an eyelash set 5 in position. In this embodiment the holder 3 fits over one end 2 of the handle 1 and the holder 3 comprises clip means into which the eyelash set can be inserted for testing.

FIGURE 8 illustrates a rack 5 in which a number of holders can be supported. In FIGURE 8 one of the holders 3 is illustrated in position in broken lines. The rack 5 illustrated can take five holders which can be supported in five set positions in the rack 5. Each position has a tooth 6 over which an open end of a holder 3 may fit. The holder when in position is then supported at an angle in the rack by another tooth 7 and by a pillar 8. Each holder 3 has an open end not only to fit over a tooth 6 in the rack but also to fit over the end of the handle as illustrated in FIGURE 5. If the rack 5 be disposed within a box and if five holders 3 be assembled on the rack each with an eyelash set 4 in position a user can test the different eyelashes by changing the holders by removing one from the handle and by replacing it with another rather than by changing eyelashes.

It will be seen that with both embodiments of the invention the elongated handle 1 has a substantially L-shaped connector portion connected at one end thereto. This substantially L-shaped connector portion is connected at its end distant from the handle 1 to the curved part 4 which corresponds to the curvature of the eyelid and to which the artificial eyelash is attached for testing purposes. The opposed end of the substantially L-shaped connector portion is connected directly to and extends upward from the top end of the handle 1. In the case of FIGS. 1–4 this substantially L-shaped portion forms an integral extension of the curved portion 4 which carries the artificial eyelash. The end of the substantially L-shaped connector portion distant from the curved part 4 is fixed permanently with the top end of the handle 1.

However, in the case of FIGS. 5–7, it will be seen that the curved part 4 is connected to one end of a substantially L-shaped connector portion which at its opposite end is formed with an opening to receive the top end of the handle 1, and in this case the top end of the handle 1 is inclined in the manner most clearly apparent from FIG. 6 to be received in the opening in one leg of the substantially L-shaped connector portion. As is particularly apparent from FIG. 6, the curved part which carries the artificial eyelash is located in a plane which is substantially perpendicular to the downwardly inclined part which is formed with the opening which receives the top end of the handle 1.

I claim:

1. An eyelash testing kit comprising an elongated handle having a top end, a plurality of substantially L-shaped connector portions having means for detachably connecting said handle top end thereto with one end leg extending upwardly from said top end of said handle and another leg extending laterally from said one leg and terminating at an end distant from said one leg, and a curved eyelash carrier having a curvature conforming to that of an eyelid and connected at one end to said end of said other leg which is distant from said one leg, said carrier extending from said other leg in a direction away from said one leg and beyond the end of said other leg that is distant from said one leg, so that an eyelash can be semi-permanently attached to said carrier to be held next to an eyelid without being attached thereto to test the appearance of the eyelash, said means for deachably connecting said handle and connecting portion including at said one leg a hollow construction terminating in a bottom open end for receiving the top end of said handle so that each said connector portion and eyelash carrier can be removably connected with said handle.

2. The combination of claim 1 and wherein said curved eyelash carrier is stiuated in a plane which is perpendicular to said one leg.

3. The combination of claim 2 and wherein said one leg extends upwardly at approximately a 45° angle from said handle.

References Cited
UNITED STATES PATENTS

| | | | |
|---|---|---|---|
| 1,907,476 | 5/1933 | Ballard et al. | 132—88.5 |
| 3,343,552 | 9/1967 | Steffen | 132—88.7 |

FOREIGN PATENTS 1,021,063  2/1966  Great Britain.

F. BARRY SHAY, Primary Examiner

G. E. McNEILL, Assistant Examiner

U.S. Cl. X.R.

132—1